United States Patent
Jiang et al.

(10) Patent No.: US 11,514,489 B2
(45) Date of Patent: Nov. 29, 2022

(54) TARGETED DOCUMENT INFORMATION EXTRACTION

(71) Applicant: SAP SE, Walldorf (DE)

(72) Inventors: Ying Jiang, Berlin (DE); Christian Reisswig, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/142,865

(22) Filed: Jan. 6, 2021

(65) Prior Publication Data

US 2022/0215446 A1    Jul. 7, 2022

(51) Int. Cl.
*G06Q 30/04*    (2012.01)
*G06F 40/186*   (2020.01)
*G06F 40/169*   (2020.01)
*G06Q 30/06*    (2012.01)
*G06F 3/0481*   (2022.01)

(52) U.S. Cl.
CPC .......... *G06Q 30/04* (2013.01); *G06F 40/169* (2020.01); *G06F 40/186* (2020.01); *G06Q 30/0635* (2013.01)

(58) Field of Classification Search
CPC .. G06Q 30/04; G06Q 30/0635; G06F 40/169; G06F 40/186; G06V 30/41

USPC ......................................................... 705/34
See application file for complete search history.

(56) References Cited

U.S. PATENT DOCUMENTS

| | | | |
|---|---|---|---|
| 10,540,579 B2 * | 1/2020 | Reisswig | G06V 30/19173 |
| 2003/0095135 A1 * | 5/2003 | Kaasila | G06F 3/0481 |
| | | | 345/613 |
| 2022/0092328 A1 * | 3/2022 | Hoehne | G06F 16/90344 |

* cited by examiner

*Primary Examiner* — Garcia Ade
(74) *Attorney, Agent, or Firm* — Sterne, Kessler, Goldstein & Fox P.L.L.C.

(57) ABSTRACT

Disclosed herein are various embodiments for targeted document information extraction. An embodiment operates by receiving a document associated with a particular customer of a plurality of customers. It is determined whether to use a global processor or template processor to analyze the document based on whether one or more customer templates are associated with the particular customer. Which of the one or more templates associated with the particular customer correspond to the document is identified. The document is compared to the identified template associated with the customer. Information is extracted from the document based on the identified template and the identified plurality of variations. The extracted information for the document is output.

20 Claims, 4 Drawing Sheets

TARGETED DOCUMENT INFORMATION EXTRACTION

BACKGROUND

Optical character recognition (OCR) is a technique used to identify text or characters in an image. However, a user often wants more context about the information being conveyed beyond the simple identification of text or characters in an image. For example, knowing the letters that appear on a sales invoice may not help a sales associate who wants to know what products were ordered on a particular date. However this type of contextual analysis and information extraction is beyond the scope of an OCR system.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Optical character recognition (OCR) is a technique used to identify text or characters in an image. However, a user often wants more context about the information being conveyed beyond the simple identification of text or characters in an image. For example, knowing the letters that appear on a sales invoice may not help a sales associate who wants to know what products were ordered on a particular date. However this type of contextual analysis and information extraction is beyond the scope of an OCR system.

Information extraction systems may provide a user greater context as to what information is contained in a document. Information extraction system are usually trained to identify contextual information across a wide range of documents. This enables that system to be able to receive and process virtually any document and provide some output regarding the identified text in the received documents.

This type of generalized training however may require thousands or tens of thousands or more of training documents, and large quantities of computing resources in both training and document analysis. The result of this training is an information extraction system that is capable of receiving a wide variety of documents, but with a relatively low accuracy or precision (e.g., with high error rates). Further, this type of information extraction system is not helpful when a user or organization only needs a smaller array of documents analyzed but wants a higher accuracy rate (e.g., lower error rate).

There are challenges however in adapting or retraining a generalized information extraction system for a specific document or set of documents. First, the time and computing resources required to retrain the system may be prohibitive enough to decide to forgo the specialization. And second, specifically training a general use system on one type or format of document could adversely impact the system's ability to continue to accurately identify or extract information from other types of documents for which the system was previously trained.

Thus while the accuracy for one document type may increase with a new influx of specifically targeted training documents, an unintended consequence may be that the accuracy for other document types may decrease or otherwise be adversely affected. Thirdly, the processing time for documents may also increase.

Figure 1:
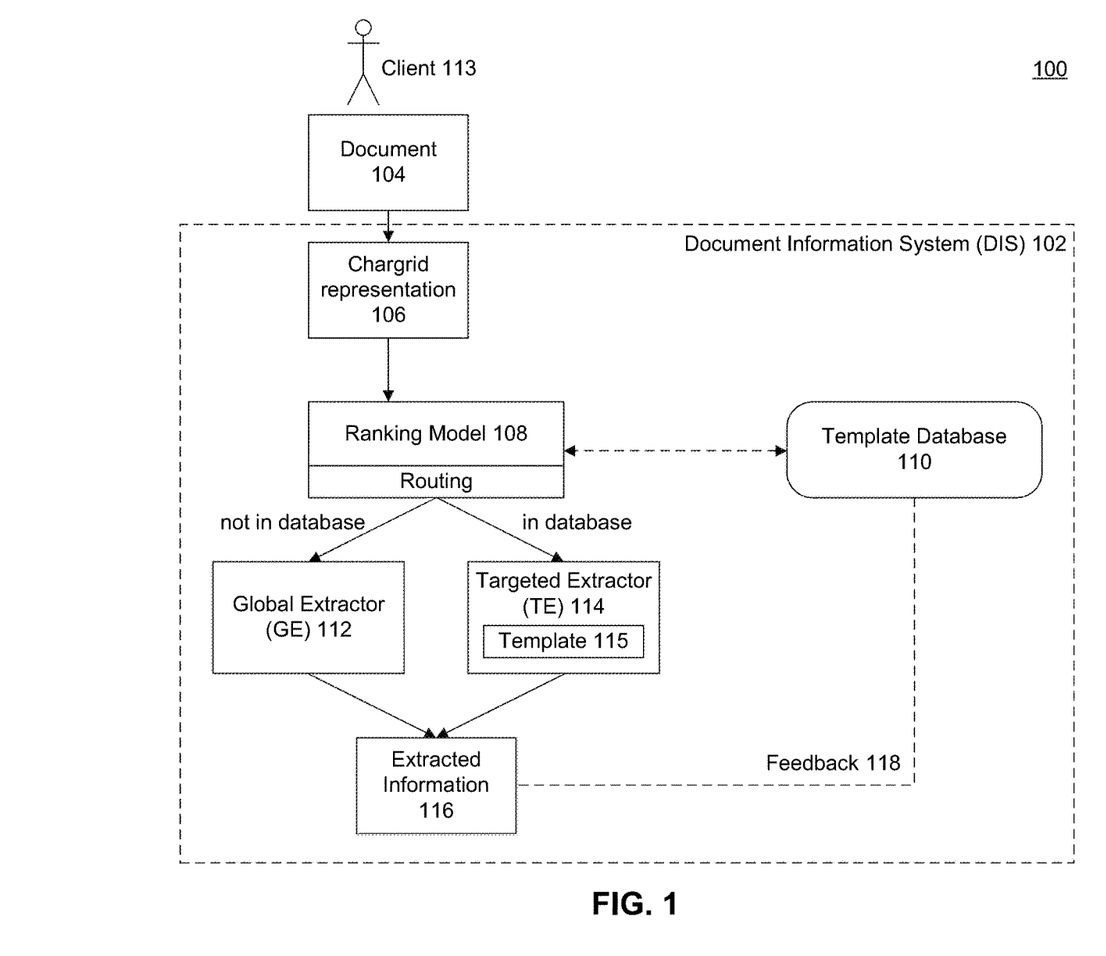
FIG. 1 is a block diagram illustrating example functionality related to targeted document information extraction, according to some example embodiments.

FIG. 1 is a block diagram 100 illustrating example functionality related to targeted document information extraction, according to some example embodiments. Rather than simply relying on a general use or generic information exaction system that is used to extract information from a large variety of documents in varying formats, document information system (DIS) 102 enables for the configuration and/or use of more specialized or targeted document extraction systems (e.g., targeted extractor (TE) 114) for specific document formats.

DIS 102 may enable the use of both specialized TEs 114, and for any documents 104 without a specialized TE 114 available, DIS 102 may use a general extractor (GE) 112 which may be trained to analyze and process a wider array of document types. DIS 102 may improve information extraction accuracy with lower error rates, increase document processing speed and overall system throughput all while minimizing maintenance and refinement or feedback implementation costs.

DIS 102 leverages the abilities of both a GE 112 and a TE 114 to be able to extract information from a large variety of documents with greater speed, efficiency, and accuracy than was previously available using only a general information extractor or processor. Further, DIS 102 allows for parallel processing and greater document throughput with one or more GEs 112 and one or more TEs 114 operating in parallel.

In an embodiment, DIS 102 may receive a document 104 for processing. Document 104 may be a file (or set of files) containing an image or scan of a business document or other type of document. For example, document 104 may be a scan of a hardcopy of a sales invoice or sales receipt. In other embodiments, document 104 may be land records, medical records, tax information, sports scores, etc.

In an embodiment, DIS 102 may use OCR or other image processing to convert or transform document 104 into a character-grid (chargrid) representation 106 (hereafter referred to as chargrid 106).

In an embodiment, chargrid 106 may indicate the size and/or position of various identified characters within document 104. U.S. patent application Ser. No. 10/540,579B2, titled "Two-dimensional document processing" to Reisswig, et. al. (filed May 18, 2018) describes example embodiments for generating a chargrid from a document 104, and is hereby incorporated by reference in its entirety.

In an embodiment, chargrid 106 may include, point to, or refer to an index of various alphabetic or other characters that may be identified within document 104. Chargrid 106 may include references to the index values of each identified character, and location and/or size information for the identified character on document 104. For example, chargrid 106 may indicate a tuple (3, 4, 10) for a particular character or pixel location of document 104 which may respectively correspond to a pixel width, pixel height, and index value for a character (such as the letter "T").

In an embodiment, DIS 102 may receive chargrid 106 in addition to or in lieu of document 104 without performing the transformation of document 104 into chargrid 106. As used herein, chargrid 106 and document 104 may be used interchangeably to refer to the incoming file that is being processed by DIS 102, and for simplicity, may generally be referred to herein as document 104.

In an embodiment, a ranking model 108 may identify how to route document 104 for information extraction using either GE 112 or TE 114. For example, ranking model 108 may have access to one or more templates 115 as stored in a template database 110. Ranking model 108 may compare document 104 to the templates 115 of template database 110 to determine whether to route document 104 to GE 112 or TE 114 for analysis. Additional embodiments of the operations of ranking model 108 are discussed in greater detail below with regard to FIG. 2.

Template database 110 may include a set of templates 115 for one or more users, customers, or clients 113. In an embodiment, each template 115 may include an input document with annotations in the form of bounding boxes that indicate correct predictions or identified information (e.g., the output desired as extracted information 116).

In an embodiment, a chargrid representation (e.g., 106) may be generated for each template 115. In an embodiment, each template 115 may include one or more tuples, such as (C, A), where C indicates the chargrid representation 106 and A indicates the annotations for a specific document or type of document.

In an embodiment, template database 110 may store templates 115 which may include versions documents that have been submitted as correct by client 113. Each template 115 may then be used to enhance the operations of an existing TE 114, create a new TE 114, or may be made available to TE 114 when a corresponding document 104 is received.

In an embodiment, ranking model 108 may classify or rank how close the input document 104 is to any of the template documents 115 in the template database 110. The classification task of ranking model 108 in determining whether a template 115 corresponds to an input document 104 may not be trivial because the same document template 115 may occur with different variations. For example, different documents for the same template 115 may include different number of line items, different data, different dates, different amounts, etc. In an embodiment, ranking model 108 may select and return the closest template 115 for an incoming document 104, or may only return a template 115 that exceeds a minimum similarity or matching threshold.

Ranking model 108 may then route document 104 to TE 114 for analysis. If however, no matching template 115 that exceeds the threshold is identified, document 104 may be provided to GE 112 for processing or analysis.

Figure 2:
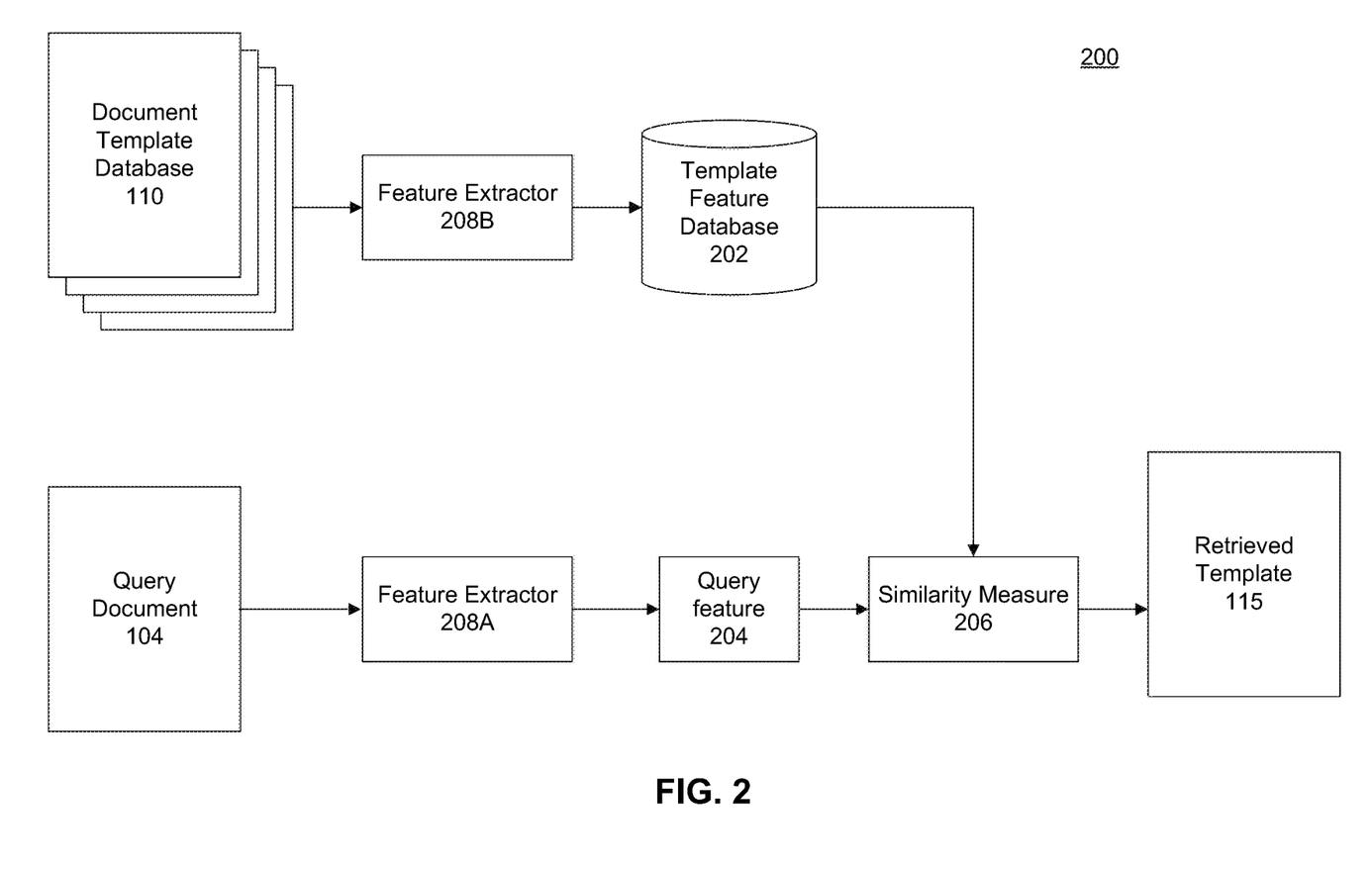
FIG. 2 is a block diagram illustrating example operations of ranking model, according to some embodiments.

FIG. 2 is a block diagram 200 illustrating example operations of ranking model 108, according to some embodiments.

As described above, ranking model 108 may receive an incoming or query document 104 (which may include a chargrid 106 of the document 104). To determine whether an incoming document 104 corresponds to a template 115 of template database 110, ranking model 108 may utilize or include one or more feature extractors 208A, 208B.

In an embodiment, feature extractor 208B may compute or identify the features for the templates 115 stored in template database 110. In an embodiment, prior to DIS 102 receiving document 104 for processing, feature extractor 208B may generate a template feature database 202, including the identified and distinguishing or unique features amongst the templates 115. These extracted features (e.g., query features 204) may include a size and shape of document, any provided client or document number information, or one or more portions of a chargrid 106 that indicate which characters were identified in a particular portion of document, etc.

When document 104 is received by ranking model 108, feature extractor 208A may extract certain identifiable query features 204 which correspond to one or more of the features from template feature database 202. In an embodiment, feature extractors 208A and 208B may be the same feature extractor that is used to compare output features. In embodiment, the query features 204 may include the placement of various lines, shapes, or characters/words. For example, chargrid 106 may indicate that characters such as "Company A", "Doc ID 1234", "Invoice A12B" were identified on the top right, top center, or bottom left of document 104. These features 204 may be identified as being present (or not) within the incoming document 104.

In an embodiment, ranking model 108 may then compute or generate a similarity measure 206 based on comparing the identified query features 204 from document 104 to the features of the template feature database 202 that distinguish between different templates 115. Similarity measure 206 may be a score that indicates a level of correspondence between the identified query features 204 and the certainty that the document 104 corresponds to a particular template 115. In an embodiment, similarity measure 206 may include an indication of how many query features 204 of a particular template 115 were identified in an incoming document 104. In an embodiment, similarity measure 206 may need to exceed a threshold for a template 115 to be deemed identified by ranking model 108.

Returning to FIG. 1, ranking model 108 identifies a template 115 that corresponds to the features of document 104, then ranking model 108 may route document 104 to TE 114 for processing and analysis. If however, no template 115 exceeds a similarity threshold, ranking model 108 may route document 104 to GE 112 for processing and analysis. In another embodiment, document 104 may be provided to both GE 112 and TE 114.

Global extractor (GE) 112 may be a generalized information extraction system that is trained and configured to identify and extract information across a wide range of varying documents (e.g., document formats, document types, file types, with varying information or data). In an embodiment, GE 112 may include machine learning and/or neural network systems that are trained using a set of input documents (e.g., chargrids 106) and annotated versions or ground truth of those documents indicating the desired output.

Training a system to be able to receive and process a wide range of documents often requires a large set of training documents (including both input and annotations) and requires lots of developer time and computing cycles to train and refine. For example, the training may include that the ability of GE 112 to analyze document 1 is does not interfere or degrade its performance or analysis with regard to document 2, and vice versa. Such systems may be configured to improve accuracy over time as they receive feedback 118.

However, because GE 112 may be configured to receive a wide array of varying documents of unknown types and formats, there is often a tradeoff in maintaining input flexibility (e.g., of submitting any random document 104 without providing additional information or performing prior analysis to identify a document type) and the level of accuracy with which GE 112 can analyze and extract information from any one particular document 104.

For example, the greater the range or variety of documents that can be processed by GE 112, the lesser the specificity that may be obtainable for any one specific document 104. Further, if a large number of training documents correspond to a specific document type or format, this may adversely affect the ability of GE 112 to accurately process or extract information from other types of documents.

In an embodiment, GE 112 may be trained to receive thousand or tens of thousands of document types from various, multiple clients 113. Client 113 may be an individual or organization that is using or has access to DIS 102 and is submitting documents 104 for processing. In an embodiment, ten clients 113 with access to DIS 102 may submit a thousand different types of documents which need to be processed or analyzed for information extraction by DIS 102.

As an example, using only GE 112, DIS 102 may be able to produce an overall accuracy of 80% for the identification, labeling, and extraction of information from input documents 104. However, a specific client 113 may have a business that is primarily focused on receiving two specific types of documents, such as sales invoices and sales receipts, which are very important to the client 113. In another embodiment, the important documents may include three different formats for a sales invoice that the client 113 uses.

For this client 113, the 80% accuracy rate may be too low for their particular needs in document processing. However, as referenced above, retraining GE 112 to improve accuracy for the documents of client 113 may adversely affect the accuracy of GE 112 with regard to other types of documents for that and other clients. This retraining may also require a large training data set of documents as well as large quantities of computing resources and hours to complete the training. Then additional resources would then be required to roll out the retrained system to make it accessible to all the clients, which may also require system downtime.

In addressing these challenges, DIS 102 may use one or more targeted extractors (TE) 114, which may also implement machine learning and neural network technology. However, unlike a GE 112 which may be configured to read a wide array of documents using a large data set of training documents, TE 114 may be trained to identify variations using a small set of training documents (including a single annotated document) for a specific or identified target document type or format, as may correspond to a template 115. This may enable client 113 to submit new document templates 115 for their business documents for which to use TE 114.

This document-specific variation training of TE 114 is different from the wide array of documents training of GE 112 as described above and produces different inputs and different functionality for the extraction systems. For example, any document 104 from any client 113 may be provided to GE 112, which may include tens of thousands of different types of documents, document formats, or file types. GE 112 may then, without further input, analyze, identify, and extract information from any of a wide range of documents.

TE 114 by contrast may receive both the document 104 and a specific template 115 (as identified by ranking model 108) corresponding to the input document 104. Without the need to start from scratch with the unknown type or format of the incoming document 104, TE 114 may use template 115 as a basis for more quickly and accurately extracting information from the incoming document 104.

As noted above, template 115 may include any number of training documents and annotations, which may include as few as one annotated training document. From this training document, TE 114 may extrapolate and identify variations in wording, size, font, positioning, etc. to identify and extract information from the corresponding input document 104.

In an embodiment, TE 114 may receive as input document 104 and the best matching template 115 from template database 110. TE 114 may extract information from the document 104 using the provided template 115. Since the document 104 corresponds to a known template 115, TE 114 may be able to extract information from document 104 with a higher degree of accuracy than GE 112. In an embodiment, the known template 115 may also improve the speed of processing for TE 114 relative to GE 112. In an embodiment, each different document type or format for which greater accuracy is needed may have its own template 115.

In an embodiment, DIS 102 may include a separate TE 114 processing system for separate templates 115. For example, client 113 may provide ten different types of document to DIS 102 for processing. However, the client 113 may only submit three templates 115 that correspond to three highest value or most important document types. In an embodiment, DIS 102 may configure three different TEs 114, one corresponding to each submitted template 115.

In this embodiment, TE 114 may be overfitted, as a specialist TE 114 on the specific document template 115 and its variations. In an embodiment, each specialist TE 114 may be specifically trained as described by various embodiments in U.S. Pat. No. 10,540,579 titled "Two-Dimensional Document Processing" filed Mar. 18, 2018 to Reisswig et. al., which is hereby incorporated by reference in its entirety. Then for example, rather than providing a template 115 to TE 114, ranking model 108 may simply route document 104 to the corresponding specialist TE 114 for processing (which may have already been trained with the corresponding template 115).

TE 114 (which may be a specialist TE 114) may be trained to be able to identify variations in document 104 and template 115. For example, an address field of document 104 may be shifted a few pixels left from template 115, while a date field of document 104 may be missing from where expected as indicated by template 115. TE 114 may be able to identify these and other variations between template 115 and document 104. Other variations include, but are not limited to: spatial offsets, different text (the annotated boxes therefore having a slightly different size), and generally there may also be a different number of line items.

In an embodiment, template 115 may include a chargrid 106 and the corresponding annotations which may take the form of a segmentation mask and a bounding box. These may be provided, within TE 114, to a convolutional encoders and may be fused together before entering the decoder stage. The fully convolutional decoder of TE 114 may then outputting a 'corrected' segmentation mask and 'corrected' bounding boxes as extracted information 116. Here, 'corrected' means that the input 'template annotations' are adjusted by the model to fit the incoming document specifics. Since the template annotations are assumed to be already close to the incoming document (because the incoming document is just a minor variation of the determined known template), the extraction accuracy will be high.

DIS 102 (through GE 112 or TE 114) may generate extracted information 116. Extracted information 116 may include any information that was identified and extracted from document 104. In an embodiment, extracted information may be produced or generated in any form, including but not limited to text in a spreadsheet, database entries, or a Javascript Object Notation (JSON) file. In an embodiment, extracted information 116 may identify a field from document 104 and any corresponding data in that field. For example, extracted information 116 may include (Name, Steven), (Date, Oct. 22, 2020), (Order, Product Max Super-Pro), in which the first item is the field name, and the second item it the extracted data.

In an embodiment, DIS 102 may include a feedback loop 118 that receives and improves system performance based on system functionality and user feedback 118. Feedback 118 may indicate correctly and/or incorrectly identified or output extracted information 116. This feedback 118 may be used by the machine learning systems of GE 112 and/or TE 114 to improve performance or accuracy scores.

In an embodiment, feedback 118 may include the submission of new templates 115 to template database that are used to generate new TE 114 systems or improve an existing TE 114. For example, client 113 may have only submitted a single document and annotation as template 115 for TE 114. However, feedback 118 may include a new annotated document for the same type of document for which TE 114 was trained, and could be used by TE 114 to supplement existing functionality and improve accuracy.

In an embodiment, client 113 may configure or request TE 114 for each unique document type, or may use TE 114 across a small subsection of documents. For example, client 113 may use the same TE 114 to analyze two specific types of documents, while GE 112 may be used to identify any other document type. In an embodiment, different clients 113 may have their own unique TEs 114.

In an embodiment, If a user or client 113 is dissatisfied with the extraction performance of the generic model for a given document template, the user may correct the predictions by providing the corrected annotations in the form of bounding box annotations for the fields of interest as feedback 118. With only a single document for a given type of template 115 may be used by DIS 102 to configure TE 114 for the document type. The corrected document becomes a new 'template' and is stored in template database 110.

When a set of multiple specialist TEs 114 are used, retraining will be triggered for only the specialist TE 114 corresponding to the feedback 118. However, other special TEs 114 or the GE 112 will not need to be retrained. Additionally, the ranking model 108 may continue operations without retraining since the ranking model 108 has learned to find similar documents irrespective of the specific template 115. However, it is possible to fine tune the ranking model 108 for specific client 113 provided document templates 115 to improve the accuracy if needed.

Figure 3:
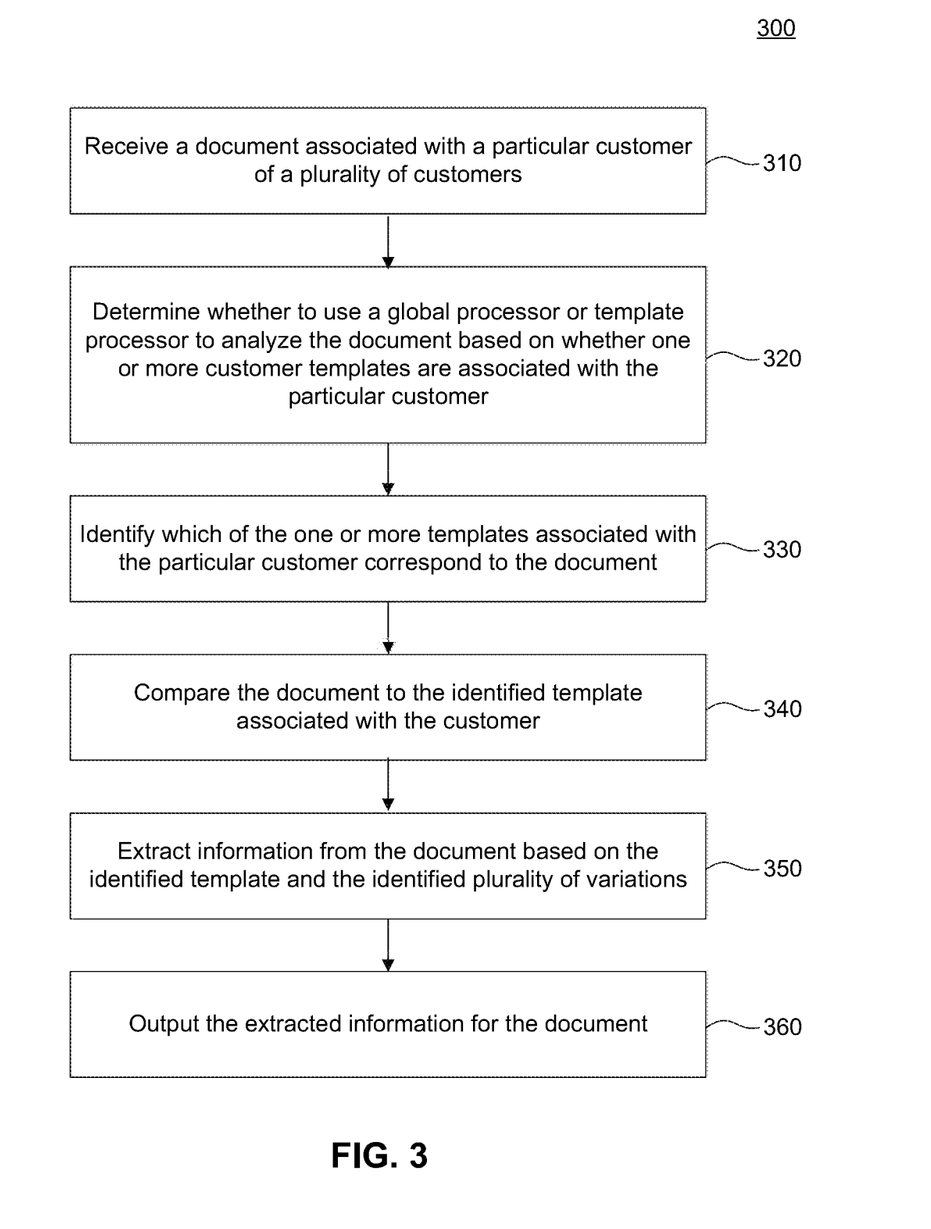
FIG. 3 is a flowchart illustrating example operations for targeted document information extraction, according to some embodiments.

FIG. 3 is a flowchart illustrating example operations for targeted document information extraction, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to the figures.

In 310, a document associated with a particular customer of a plurality of customers is received. For example, document 104 may be received by DIS 102. Document 104 may include a file of an image or scan of a document with a number of different fields and corresponding data or information that is either printed by computer and/or hand written. Example fields include name, address, cost, product name, service requested, service date, provider, etc.

In 320, it is determined whether to use a global processor or template processor to analyze the document based on whether one or more customer templates are associated with the particular customer. For example, ranking model 108 may calculate a similarity measure 206 between document 104 and the available templates 115 of template database 110 (for a particular client 113) to determine whether to use TE 114 or GE 112. In an embodiment, ranking model 108 may only compare document 104 to the available template(s) 115 for the identified customer or client 113.

In 330, which of the one or more templates associated with the particular customer correspond to the document is identified. For example, ranking model 108 may determine that a similarity measure 206 for an incoming document 104 and a particular template 115 exceeds a threshold. Then, for example, ranking model 108 may provide the document 104 to the corresponding TE 114 which may have been preconfigured to analyze any documents of a specific type that correspond to the identified template 115. In an embodiment, ranking model 108 may provide a link or address of the corresponding template 115 or route document 104 to the specialist TE 114 without additionally providing a template 115 or template address.

In 340, the document is compared to the identified template associated with the customer. For example, TE 114 may use machine learning and neural network technology to analyze document 104 and extract information from document 104 that is indicated by template 115. The data or fields of information of document 104 may not appear exactly the same as template 115, however TE 114 may be trained to identify variations between document 104 and template 115 and make semantic connections within a particular document differentiation threshold. If the format or wording or layout of document 104 is beyond the specific threshold, then the data may be not properly identified or marked as unknown.

In 350, information is extracted from the document based on the identified template and the identified plurality of variations. For example, TE 114 may identify the name, address, cost, products ordered, amounts paid fields from a sales document 104 that corresponds to a previously submitted or identified template 115.

In 360, the extracted information may be output for the document. For example, the extracted information 116 may be provided in a JSON file format for use by a user or another system. In another embodiment, the extracted information 116 may be provided to a user device for display.

Figure 4:
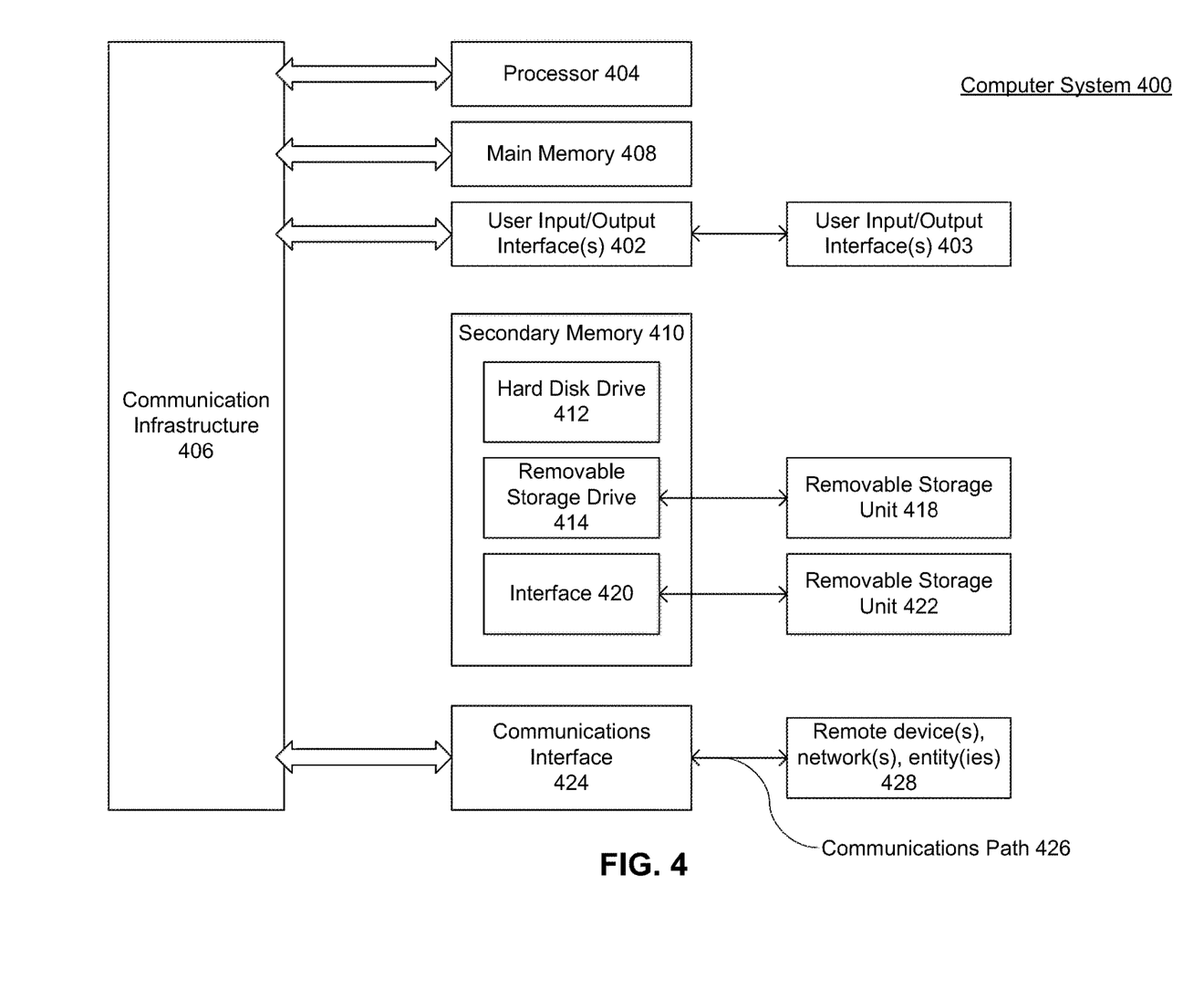
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random-access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" and/or cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    receiving a document associated with a particular customer of a plurality of customers, wherein the document comprises a plurality of fields and corresponding data in an image format;
    determining whether to use a global processor or a template processor to analyze the document based on comparing one or more features extracted from the document to one or more features of each of a plurality of templates, wherein each of the plurality of templates corresponds to the template processor, wherein the global processor is configured to analyze any document across the plurality of customers, and wherein the template processor is configured to analyze a narrower range of documents than the global processor using one of the plurality of templates;
    routing the document to the template processor based on the comparing;
    comparing, by the template processor, the document to the identified template associated with the customer, wherein the template processor is configured to identify a plurality of variations on the identified template;
    extracting, by the template processor, information from the document based on the identified template and the identified plurality of variations, wherein the extracted information comprises the plurality of fields and corresponding data in a textual format; and
    outputting, by the template processor, the extracted information for the document.

2. The method of claim 1, wherein the document comprises a scanned document of an invoice or order form.

3. The method of claim 1, wherein the receiving comprises:
    generating a character grid representation of the document comprising a location and corresponding character index information for the location.

4. The method of claim 1, further comprising:
    receiving, by the template processor prior to the receiving the document, the identified template comprising a base document and an annotated version of the base document.

5. The method of claim 1, wherein each of the plurality of customers have access to their own template processor to analyze known customer-specific documents.

6. The method of claim 5, wherein each of the plurality of customers also have access to the global processor to analyze either the known customer-specific documents and any unknown documents.

7. The method of claim 1, wherein a first one of the one or more templates of the particular customer corresponds to a first template processor, wherein a second one of the one or more templates of the particular customer corresponds to a second template processor, and wherein either the first template processor or the second template processor is used to analyze the document.

8. A system, comprising:
    a memory; and
    at least one processor coupled to the memory and configured to perform instructions that cause the at least one processor to perform operations comprising:
        receiving a document associated with a particular customer of a plurality of customers, wherein the document comprises a plurality of fields and corresponding data in an image format;
        determining whether to use a global processor or a template processor to analyze the document based on comparing one or more features extracted from the document to one or more features of each of a plurality of templates, wherein each of the plurality of templates corresponds to the template processor, wherein the global processor is configured to analyze any document across the plurality of customers, and wherein the template processor is configured to analyze a narrower range of documents than the global processor using one of the plurality of templates;
        routing the document to the template processor based on the comparing;
        comparing, by the template processor, the document to the identified template associated with the customer, wherein the template processor is configured to identify a plurality of variations on the identified template;
        extracting, by the template processor, information from the document based on the identified template and the identified plurality of variations, wherein the extracted information comprises the plurality of fields and corresponding data in a textual format; and
        outputting, by the template processor, the extracted information for the document.

9. The system of claim 8, wherein the document comprises a scanned document of an invoice or order form.

10. The system of claim 8, wherein the receiving comprises:
    generating a character grid representation of the document comprising a location and corresponding character index information for the location.

11. The system of claim 8, wherein the operations further comprise:
    receiving, by the template processor prior to the receiving the document, the identified template comprising a base document and an annotated version of the base document.

12. The system of claim 8, wherein each of the plurality of customers have access to their own template processor to analyze known customer-specific documents.

13. The system of claim 12, wherein each of the plurality of customers also have access to the global processor to analyze either the known customer-specific documents and any unknown documents.

14. The system of claim 8, wherein a first one of the one or more templates of the particular customer corresponds to a first template processor, wherein a second one of the one or more templates of the particular customer corresponds to a second template processor, and wherein either the first template processor or the second template processor is used to analyze the document.

15. A non-transitory computer-readable device having instructions stored thereon that, when executed by at least one computing device, cause the at least one computing device to perform operations comprising:
- receiving a document associated with a particular customer of a plurality of customers, wherein the document comprises a plurality of fields and corresponding data in an image format;
- determining whether to use a global processor or a template processor to analyze the document based on comparing one or more features extracted from the document to one or more features of each of a plurality of templates, wherein each of the plurality of templates corresponds to the template processor, wherein the global processor is configured to analyze any document across the plurality of customers, and wherein the template processor is configured to analyze a narrower range of documents than the global processor using one of the plurality of templates;
- routing the document to the template processor based on the comparing;
- comparing, by the template processor, the document to the identified template associated with the customer, wherein the template processor is configured to identify a plurality of variations on the identified template;
- extracting, by the template processor, information from the document based on the identified template and the identified plurality of variations, wherein the extracted information comprises the plurality of fields and corresponding data in a textual format; and
- outputting, by the template processor, the extracted information for the document.

16. The non-transitory computer-readable device of claim 15, wherein the document comprises a scanned document of an invoice or order form.

17. The non-transitory computer-readable device of claim 15, wherein the receiving comprises:
- generating a character grid representation of the document comprising a location and corresponding character index information for the location.

18. The non-transitory computer-readable device of claim 15, wherein the operations further comprise:
- receiving, by the template processor prior to the receiving the document, the identified template comprising a base document and an annotated version of the base document.

19. The non-transitory computer-readable device of claim 15, wherein each of the plurality of customers have access to their own template processor to analyze known customer-specific documents, and wherein each of the plurality of customers also have access to the global processor to analyze either the known customer-specific documents and any unknown documents.

20. The method of claim 1, wherein the routing comprises:
- generating a similarity measure based on the comparing;
- determining that the similarity measure exceeds a similarity threshold; and
- routing the document to the template processor based on the similarity measure exceeding the threshold, wherein a similarity measure less than the threshold results in routing the document to the general processor.

* * * * *